J. E. BUXTON.
Seed Dropper.
No. 106,320.                                   Patented Aug. 16, 1870.
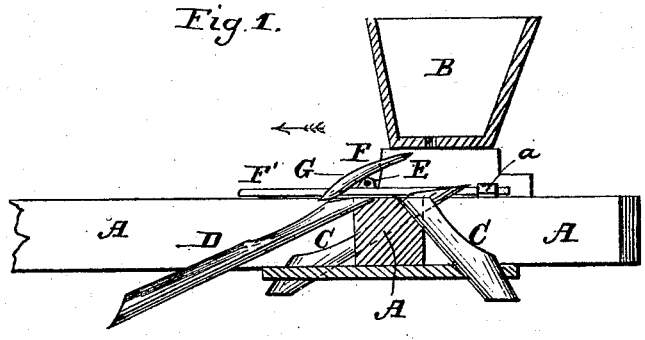
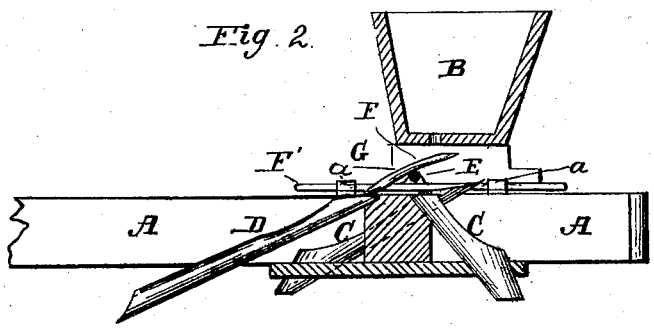
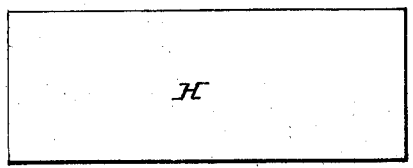
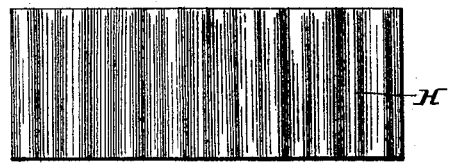
Witnesses:
A. Bernstein
Wm. C. Farwell
Inventor:
J. E. Buxton
By Farwell Ellsworth & Co.
Attorneys.

UNITED STATES PATENT OFFICE.

JOHN E. BUXTON, OF OWATONNA, MINNESOTA.

IMPROVEMENT IN COMBINED DRILL AND SEEDING-MACHINE.

Specification forming part of Letters Patent No. 106,320, dated August 16, 1870; antedated July 2, 1870.

*To all whom it may concern:*

Be it known that I, JOHN E. BUXTON, of Owatonna, in the county of Steele and State of Minnesota, have invented new and useful Improvements in Combined Drill and Seeding-Machine; and I do hereby declare the following to be a full, clear, and exact description thereof, which will enable others skilled in the art to which my invention appertains to make and use the same, reference being had to the accompanying drawings, forming part of this specification, in which—

Figure 1 is a detail vertical longitudinal section of a seeding-machine adjusted for operation as a grain-drill. Fig. 2 is a similar view of the machine adjusted for sowing broadcast. Figs. 3 and 4 are detail views of parts, to be hereinafter referred to.

Similar letters of reference indicate corresponding parts in the several figures of the drawings.

My invention has for its object to improve the means for converting a grain-drill into a broadcast-seeder, and vice versa.

It consists, first, in sliding conveyers or spouts interposed between the bottom of the hopper and the upper ends of the discharge-spouts, and adapted to slide upon the frame of the machine, to convert the latter either into a grain-drill or broadcast-seeder, the conveyers, when moved backward, guiding the grain into the broadcast-spouts, and, when moved forward, permitting it to fall directly into the drill-spouts.

It consists, secondly, in the combination of an apron with the conveyer-spouts and broadcast-spouts, for the purpose of preventing a blast of air from coming in contact with and scattering the seed during its passage from the conveyers or spouts to the broad-cast spouts.

It consists, thirdly, in the combination of a fixed apron, either plain or corrugated, with the conveyer-spouts, to be used in place of the cylindrical or conical spouts for sowing the grain broadcast.

In the accompanying drawings, A is the frame-work of the machine, to which the plows, hoes, or cultivator-teeth are attached in the ordinary manner. It may be mounted upon wheels, or not, as may be desired. B is the seed-hopper, placed transversely upon the frame, and provided with holes through the bottom, at such a distance apart as it is desired to have between the drills. C are the drill-spouts, placed transversely of the frame, beneath the hopper, in inclined positions alternately to the front and rear, and arranged to register with the holes in the bottom of the hopper. D are broadcast-spouts, also arranged beneath the hopper, transversely of the frame and inclined to the front, as shown.

These devices are all described in a patent granted to me July 6, 1869, and numbered 92,262, and do not therefore constitute the present invention.

E is a shaft, rod, or bar placed parallel with the hopper, and between the bottom of the same and the upper ends of the spouts C D. Its ends are firmly attached to the short bars or rods F', which are adapted to slide longitudinally of the frame A, in guides or eyes $a$, affixed to each side of the frame, as shown.

F are inclined conveyer-spouts, open at both ends, and affixed to the rod or bar E in such positions as to register with the holes in the bottom of the hopper.

When it is desired to operate the machine as a grain-drill, the rod E is moved in the direction of the arrow, Fig. 1, by any suitable means, carrying the conveyer-spouts clear of the holes in the bottom of the hopper to permit the grain to drop directly from the hopper into the drill-spouts C, from whence it is drilled into the ground in the usual manner.

When, however, it is desired to sow the seed broadcast, the shaft is moved backward, so that the seed from the hopper shall be guided by the conveyer-spouts into the broadcast-spouts D.

Scatterers may be affixed to the discharge ends of the scattering-spouts, or to the frame in front of the same, to scatter the grain evenly over the ground.

G is an apron, affixed either to the shaft E or to the hopper, and is designed to so fit over the ends of the broadcast-spouts as to prevent a blast of air from coming in contact with and scattering the grain during its passage from the conveyers to the broadcast-spouts.

Instead of employing the broadcast-spouts D, a plate, H, of sheet metal or other suitable material, shown in Fig. 3, may be affixed to the frame in an inclined position, to receive the grain from the conveyer-spouts and scatter it upon the ground. Or the plate may be corrugated, as shown in Fig. 4, thereby forming channels or guides for the grain from the conveyer-spouts.

Having thus described my invention, what I claim as new, and desire to secure by Letters Patent, is—

1. The conveyers or spouts F, adapted to be slid backward to guide the grain into the broadcast-spouts, and forward to permit the grain to fall directly into the drill-spouts, for the purpose of converting a seeding-machine either into a drill or broadcast-seeder, substantially as herein shown and described.

2. The combination of an apron with the conveyers and with the broadcast-spouts, for the purpose of preventing a blast of air from coming in contact with and scattering the grain during its passage from the conveyers to the broadcast-spouts, substantially as herein shown and described, for the purpose specified.

3. The combination of a fixed apron, either plain or corrugated, with the sliding conveyers, substantially as herein shown and described, for the purpose specified.

J. E. BUXTON.

Witnesses:
A. BERNSTEIN,
WM. C. FARWELL.